United States Patent [19]

Shepherd et al.

[11] 3,769,160
[45] Oct. 30, 1973

[54] NEUTRON ABSORBERS
[75] Inventors: Leslie Robert Shepherd, Broadstone; Samuel Brittan Hosegood, Wareham, both of England
[73] Assignee: United Kingdom Atomic Energy Authority, London, England
[22] Filed: May 13, 1971
[21] Appl. No.: 143,191

[30] Foreign Application Priority Data
May 21, 1970 Great Britain.................. 24,774/70

[52] U.S. Cl.................. 176/86 R, 176/33, 176/93, 252/478, 423/290, 423/291, 423/344
[51] Int. Cl. ...... G21f 1/06, G21f 1/08, G21c 11/00
[58] Field of Search...................... 252/478; 176/93, 176/86 R, 33; 23/110, 356, 358; 264/0.5; 423/290, 291, 344

[56] References Cited
UNITED STATES PATENTS

| | | | |
|---|---|---|---|
| 2,988,522 | 6/1961 | Smith et al............................ | 252/478 |
| 3,227,624 | 1/1966 | Lechevallier....................... | 176/86 R |
| 3,108,886 | 10/1963 | Adamsky et al. ............... | 252/478 X |
| 3,326,820 | 6/1967 | Cuomo et al. ..................... | 252/478 |
| 3,356,618 | 12/1967 | Rich et al.......................... | 176/93 R |
| 3,153,636 | 10/1964 | Shanta et al........................ | 252/478 |
| 3,344,080 | 9/1967 | Livey et al.......................... | 264/0.5 |
| 3,510,398 | 5/1970 | Wood................................. | 176/93 R |
| 3,321,285 | 5/1967 | Sowman............................. | 264/0.5 |
| 3,261,800 | 7/1966 | Collins............................... | 252/478 |
| 3,142,649 | 7/1964 | Blanco............................... | 252/478 |
| 3,565,762 | 2/1971 | Nickel............................... | 176/86 R |
| 3,516,948 | 6/1970 | Cledat et al. ....................... | 252/478 |

FOREIGN PATENTS OR APPLICATIONS 1,219,696 1/1971 Great Britain.................... 176/93 R

OTHER PUBLICATIONS

Samsonov et al., High Temperature Electric Insulator and Ceramics, 1967, Nucl. Sci. Abstracts, Vol. 23, Dec. 15, 1969, No. 48545.

Handbook of Chemistry & Physics, Chemical Rubber Publishing Co. (1946) Page 484–485, line 8.

Primary Examiner—Benjamin R. Padgett
Assistant Examiner—Roger S. Gaither
Attorney—Larson, Taylor & Hinds

[57] ABSTRACT

The use of nitrogen as a neutron absorber is applied by employing silicon nitride in a foamed or high density form. Materials having neutron absorption cross-sections higher than silicon nitride may be incorporated with the silicon nitride.

9 Claims, No Drawings

NEUTRON ABSORBERS

BACKGROUND OF THE INVENTION

This invention relates to neutron absorbing materials. Absorbers for absorbing thermal neutrons are employed in nuclear reactors for reactivity control purposes and for shielding parts from neutron irradiation. Suitable elements for absorption are easily selectable from inspection of a list of relevant cross sections and problems only arise in adapting the selected absorber in a form suited to "in-core" use, or in connection with the physical, chemical or radioactive nature of the products of neutron capture in the selected material.

SUMMARY OF THE INVENTION

The present invention provides a means of adapting the element nitrogen as a thermal absorber in the environment of a high temperature gas cooled reactor.

According to the invention, a thermal neutron absorber for a high temperature nuclear reactor comprises a solid ceramic body at least incorporating silicon nitride. The ceramic body may contain nitrogen in its stoichiometric proportion or may be contained in an over-pressure of nitrogen as by being enveloped in a gas tight container. In both forms, the ceramic body may be used as a control rod for a nuclear reactor or as thermal neutron shielding.

DESCRIPTION OF THE PREFERRED EMBODIMENTS

The absorption cross-section of nitrogen in the form $Si_3N_4$ is such that its use as a control absorber is limited to so called "grey" control rods, that is it cannot be assured to be a perfect absorber for thermal neutrons and as such it will not be sufficient for the shutdown control of a thermal nuclear reactor. However, it may be rendered so suitable by being adulterated with a higher cross-section material. In this respect silicon nitride, and its method of manufacture, is particularly advantageous for it can be made to assimilate sufficient boron powder, for example, to render it a very strong absorber, a black absorber, in fact, and enable it to be used as a shutdown control rod. For example, boron nitride or boron carbide may be mixed with silicon powder in proportions between 30% to 1% or less boron compound to 70% to 99% or more silicon nitride, and the mixture pressed isostatically in a manner known per se. A preferred proportion is 20% boron compound to 80% silicon nitride. Under pressure, the mixture is partially nitrided by firing in nitrogen and, at this stage, it may be machined, or otherwise shaped, also in known manner. After shaping, the compact is fully nitrided by firing at about 1,400° C in nitrogen for a second, longer, period of time.

However, other known techniques of making bulk silicon nitride may be applied to the powder mixtures as starting material.

Where concern is felt about brittleness and poor resistance to mechanical shock, of control rods made from these materials, one or more of the following possibilities may be tried. One may incorporate in the material filaments of refractory metals, such as molybedenum or tungsten, one may enclose the control rods in filamentary stockings of suitable refractory material or one may enclose the control rods in cans of high temperature materials so that in the event of breakage, the pieces of absorbing ceramic material would not fall out of the reactor core.

It is a known property of stoichiometric silicon nitride that denitridation tends to occur at very high temperatures and in an atmosphere substantially devoid of nitrogen gas, such as helium reactor coolant gas. Obviously steps would have to be taken to limit the temperature of the environment to below that at which denitridation begins, and the process is a slow one. Where there was a risk of the temperature being exceeded for a dangerously long period of time then the precaution may be taken of providing, on demand, a nitrogen atmosphere in the control rod thimbles, or of canning the material in pressurised nitrogen or simply adding nitrogen to the gas coolant of the reactor.

When employed as thermal shielding permanently located in the reactor the silicon nitride, which may be foamed to provide thermal insulation, must either be sufficiently thick to provide adequate thermal neutron absorption due to its nitrogen content, or, if requiring the addition of boron, must contain sufficient boron to last the reactor life time.

Methods by which the article of silicon nitride neutron absorber may be made are as follows:

Example I

Powdered silicon was placed in a rubber mould and subjected to isostatic pressing to produce a coherent compact. The compact is the nitrided up to 10% by firing in nitrogen. The compact is then machined to the required shape. The machined compact is then fully nitrided and has a density of 2.5

Example II

As Example I except for the fact that the powdered silicon is mixed initially with boron containing powder.

Example III

Silicon nitride powder is hot pressed at 1,700° C with the addition of a suitable binder.

Example IV

As Example III but boron nitride is mixed with the silicon nitride starting material in weight proportions 20% boron nitride 80% silicon nitride.

Example V

A silicon nitride article can be produced by flame-spraying silicon powder at about 1,400° C on to a surface which has been previously coated with a release agent, e.g., common salt, under normal atmospheric conditions. At 1,400° C the grains, being partially molten, bind together and partial nitridation occurs due to reaction with atmospheric nitrogen. When a sufficient thickness has been built up, the resulting partially nitrided silicon layer is removed and after final machining (if desired) full nitridation is carried out in the normal manner.

Any other process can be employed, which relies on light pressing at moderate temperatures of the silicon bitride powder, to produce a foamed material, there being mixed with the powder granules of a volatile nature, such as sugar balls, in any desired proportion. After light pressing the material is nitrided during which the solid granules volatilise and leave voids so that the final product is foamed silicon nitride material. Such material is useful where properties Of neutron absorption and heat insulation are required in combination. Here again the neutron absorption properties may be enhanced by incorporating a boron compound in the mix.

We claim:
1. In a high temperature nuclear reactor, a thermal neutron shielding or control rod element comprising a solid ceramic body consisting essentially of from 70 to 100 percent silicon nitride and from 0 to 30 percent by weight of a boron-containing material.

2. The high temperature nuclear reactor according to claim 1 wherein said element comprises a control rod.

3. The high temperature nuclear reactor according to claim 2 wherein said ceramic body is enclosed in a nitrogen atmosphere within a gas tight container.

4. The high temperature nuclear reactor according to claim 3 wherein said ceramic body is porous.

5. The high temperature nuclear reactor according to claim 3 wherein said neutron absorber material comprises a nitride or carbide of boron.

6. The high temperature nuclear reactor according to claim 1 wherein said solid ceramic body includes a boron-containing material in an amount of from 1 to 30 percent by weight.

7. The high temperature nuclear reactor according to claim 1 wherein said ceramic body includes reinforcing filaments of a refractory metal.

8. The high temperature nuclear reactor according to claim 6 wherein said refractory metal is selected from the group consisting of molybdenum and tungsten.

9. The high temperatuRe nuclear reactor according to claim 1 wherein said neutron absorber element comprises shielding.

* * * * *